United States Patent [19]

Sun

[11] Patent Number: 5,144,791
[45] Date of Patent: Sep. 8, 1992

[54] MODULAR BAMBOO RAKE

[76] Inventor: Han-Ching Sun, No. 43, Ta-An Rd., Tien-Chung Chen, Changhwa Hsien, Taiwan

[21] Appl. No.: 745,740

[22] Filed: Aug. 16, 1991

[51] Int. Cl.⁵ .............................................. A01D 7/06
[52] U.S. Cl. ............................. 56/400.04; 56/400.17; 56/400.19
[58] Field of Search ........... 56/400.04, 400.05, 400.06, 56/400.07, 400.16, 400.17, 400.19, 400.2, 400.21

[56] References Cited

U.S. PATENT DOCUMENTS 3,403,500 10/1968 Wirth .............................. 56/400.17
5,033,261 7/1991 Bonnes et al. ................ 56/400.21 X Primary Examiner—Terry Lee Melius
Attorney, Agent, or Firm—Ladas & Parry

[57] ABSTRACT

A bamboo rake includes a long handle and a projecting prong section with two clamping sheets holding prongs therebetween. A connector apparatus connects detachably the handle to the projecting prong section and includes a small fastening plate secured to one of the clamping sheets, a large fastening plate secured to the upper end portion of the projecting prong section, a U-shaped small retaining piece mounted pivotally on the small fastening plate, a U-shaped large retaining piece mounted pivotally on the large fastening plate, and an elongated connecting plate connected rotatably to one of the small and large retaining pieces at an end portion thereof. The other end portion of the connecting plate is connected slidably to the other of the small and large retaining pieces. The truncately conical lower end portion of the handle is clamped between the small retaining piece and the small fastening plate and between the large retaining piece and the large fastening plate.

3 Claims, 4 Drawing Sheets

5,144,791

MODULAR BAMBOO RAKE

BACKGROUND OF THE INVENTION

1. Field of the Invention

This invention relates to a bamboo rake, more particularly to a modular bamboo rake with a connector apparatus for detachably connecting a long handle to a projecting prong section.

2. Description of the Related Art

Referring to FIG. 1, a common bamboo rake has a projecting prong section 1 that is generally shaped in the form of a sector which is used for gathering grass, leaves and other material. A sleeving pipe 2 is provided on the upper end portion of the projecting prong section 1. A long handle 3 has a truncately conical lower end portion which is inserted into the sleeving pipe 2. A pair of metal nails 4 are hammered into the sleeving pipe 2 and the handle 3 so as to hold them together. It is difficult to separate the handle 3 from the projecting prong section 1 for storage and transportation.

SUMMARY OF THE INVENTION

It is therefore the main object of this invention to provide a bamboo rake with a connector apparatus for detachably connecting a long handle to a projecting prong section.

According to this invention, a bamboo rake includes a long handle and a projecting prong section with two clamping sheets holding prongs therebetween. A connector apparatus connects detachably the handle to the projecting prong section and includes a small fastening plate secured to one of the clamping sheets, a large fastening plate secured to the upper end portion of the projecting prong section, a U-shaped small retaining piece mounted pivotally on the small fastening plate, a U-shaped large retaining piece mounted pivotally on the large fastening plate, and an elongated connecting plate connected rotatably to one of the small and large retaining pieces at an end portion thereof. The other end portion of the connecting plate is connected slidably to the other of the small and large retaining pieces. The truncately conical lower end portion of the handle is clamped between the small retaining piece and the small fastening plate and between the large retaining piece and the large fastening plate.

BRIEF DESCRIPTION OF THE DRAWING

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
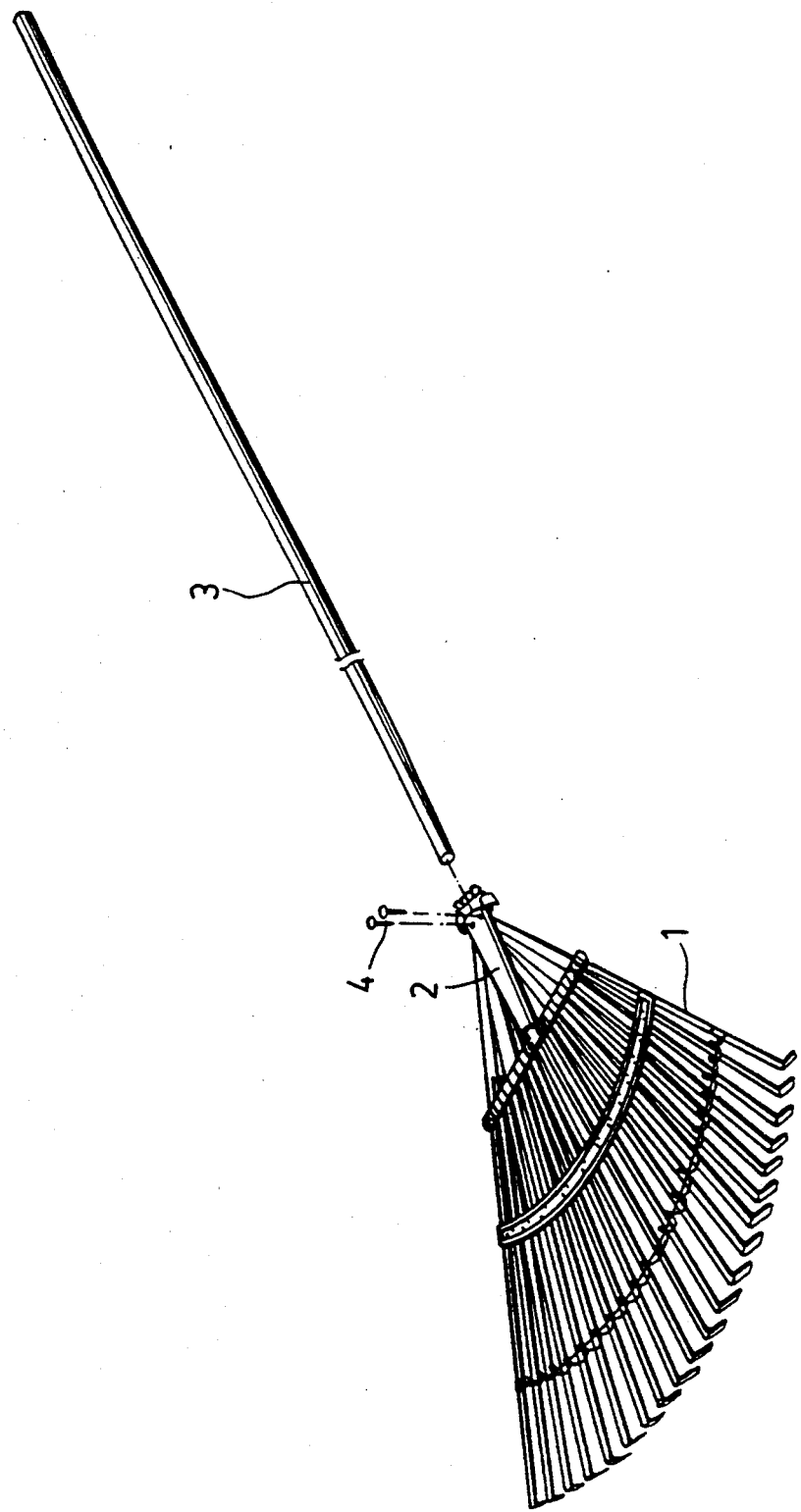
FIG. 1 is a perspective view of a conventional bamboo rake.
Figure 2:
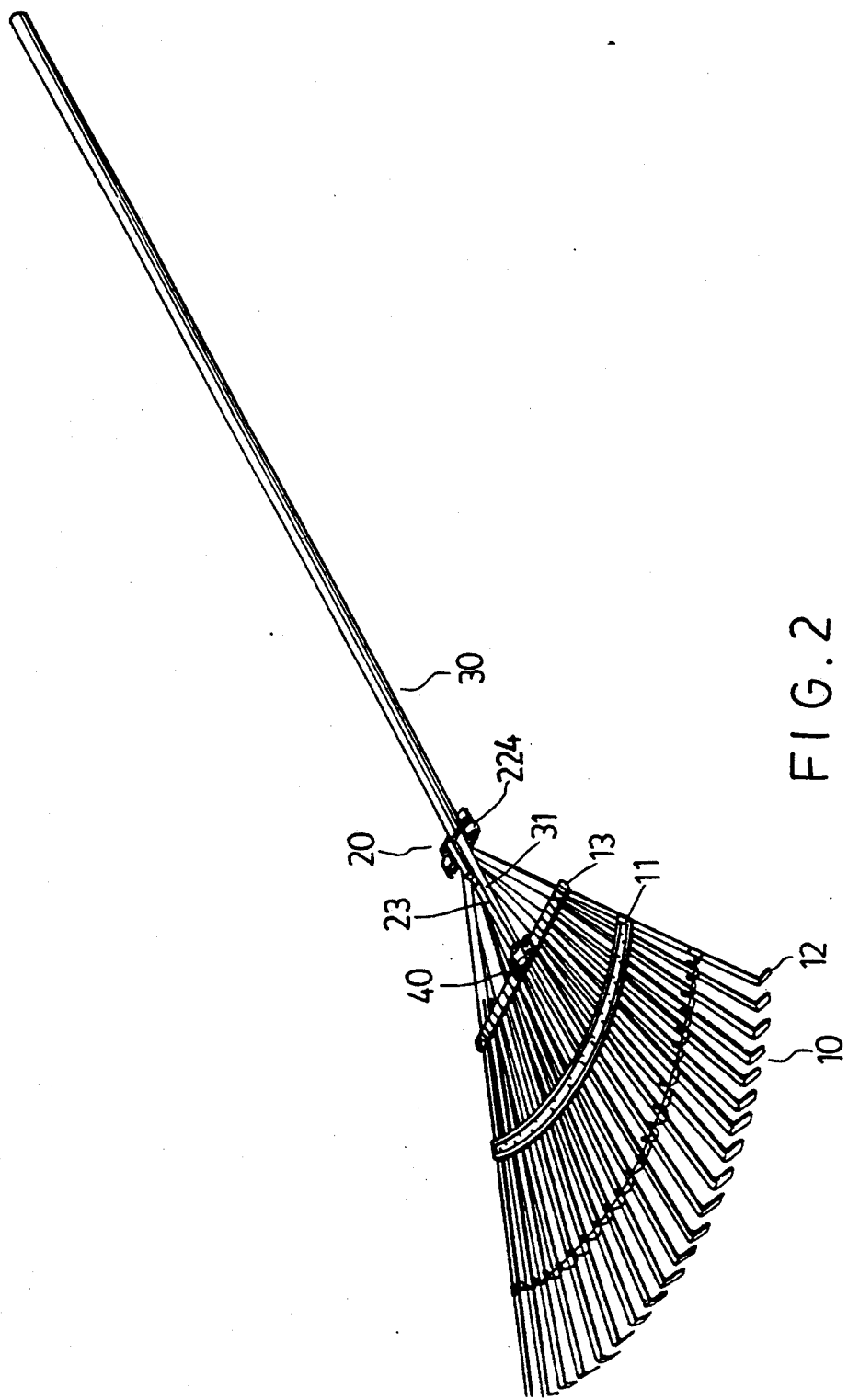
FIG. 2 is a perspective view of a modular bamboo rake according to this invention.
Figure 3:
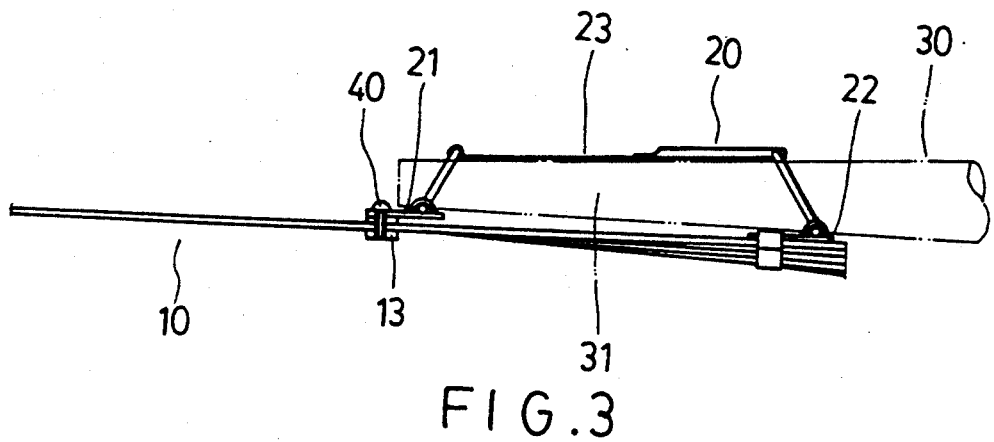
FIG. 3 is a side view showing the modular bamboo rake of this invention, wherein the long handle is indicated by phantom lines.
Figure 5:
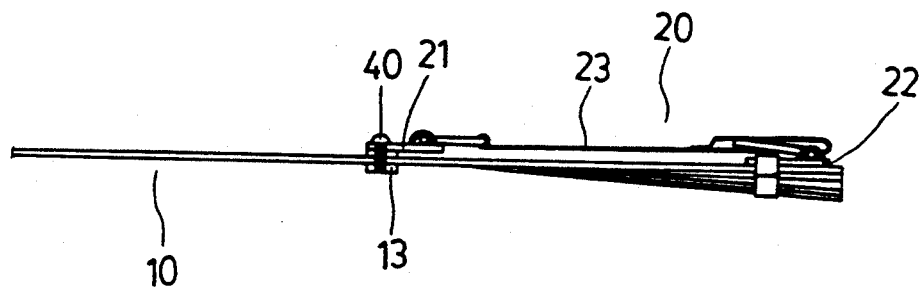
FIG. 5 is a side view showing the assembly of the projecting prong section and the connector apparatus of the modular bamboo rake according to this invention.
Figure 4:
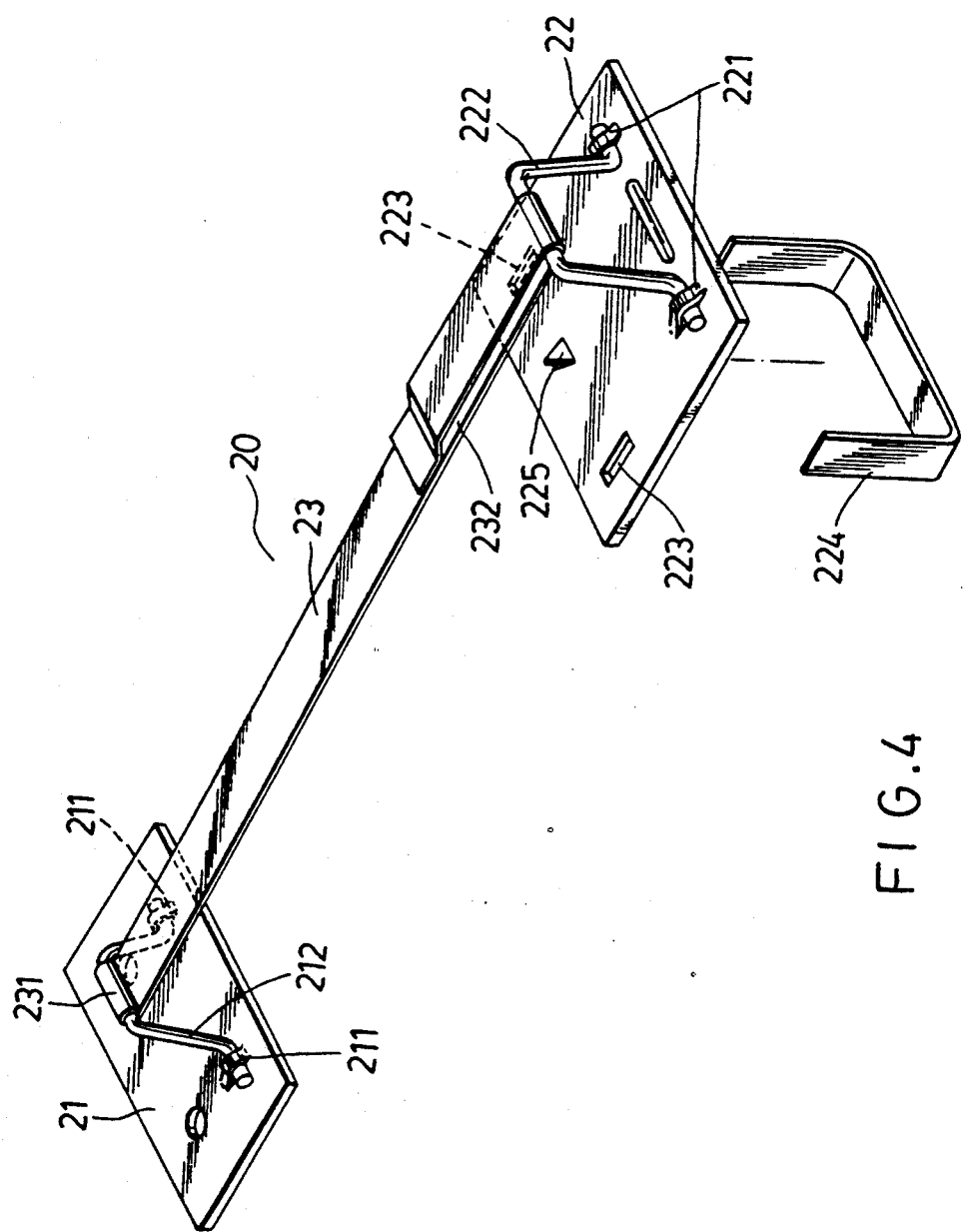
FIG. 4 is a perspective view showing the connector apparatus of the modular bamboo rake according to this invention.

Referring to FIGS. 2, 3 and 4, a modular bamboo rake of this invention includes a projecting prong section 10, a connector apparatus 20 and a long handle 30. The projecting prong section 10 consists of a positioning plate 11, a plurality of prongs 12 and a pair of metal clamping sheets 13 all of which are similar to those of the conventional rake of FIG. 1 in construction. The handle 30 has a truncately conical lower end portion 31. The modular bamboo rake is characterized by the connector apparatus 20 which consists of a small rectangular fastening plate 21, a large rectangular fastening plate 22 and an elongated connecting plate 23. All the parts of the connector apparatus 20 are made of a metal.

The small fastening plate 21 is secured to the upper surface of the upper clamping sheet 13 by a lock bolt 40, and is pressed to form two curved fastening straps 211 which define two aligned pivot holes with the small fastening plate 21, so that the two ends of a U-shaped small retaining piece 212 are mounted pivotally on the small fastening plate 21.

Similarly, a pair of curved fastening straps 221 are provided on the large fastening plate 22 so as to pivotally mount the two ends of a U-shaped large retaining piece 222 on the large fastening plate 22. As shown in FIG. 4, each of the U-shaped small retaining piece 212 and the U-shaped large retaining piece 222 has two generally longitudinal arms and a connecting portion interconnecting the longitudinal arms. Two aligned rectangular holes 223 are formed through the large fastening plate 22. A U-shaped fastening sheet 224 is disposed around the upper end portion of the projecting prong section 10 and has two parallel arms extending through the rectangular holes 223, and a connecting portion interconnecting the lower ends of the parallel arms. After having passed through the rectangular holes 223, as best shown in FIG. 2, the upper end portions of the parallel arms of the U-shaped fastening sheet 224 extend outward in a direction generally parallel to the large fastening plate 22, so as to prevent removal of the U-shaped fastening sheet 224 from the large fastening plate 22. Accordingly, the upper end portion of the projecting prong section 10 is clamped between the connecting portion of the fastening sheet 224 and the large fastening plate 22, so as to fix the large fastening plate 22 on the upper end portion of the projecting prong section 10. A pressed triangular gripping portion 225 (see FIG. 4) is provided on the large fastening plate 22 between the rectangular holes 223.

The connecting plate 23 has a rolled end portion 231 defining a pivot hole through which the connecting portion of the small retaining piece 212 extends. Accordingly, the connecting plate 23 is rotatable relative to the small retaining piece 212. The other end portion of the connecting plate 23 has a lengthwise extending slide slot 232 formed therethrough through which the connecting portion of the large retaining piece 222 extends. As a consequence, the connecting plate 23 is slidable relative to the large retaining piece 222.

As best shown in FIG. 3, the truncately conical lower end portion 31 of the handle 30 extends through the large retaining piece 222 and the small retaining piece 212 and is clamped between the large retaining piece 222 and the large fastening plate 22 and between the small retaining piece 212 and the small fastening plate 21. In this situation, as illustrated, because the small retaining piece 212 and the large retaining piece 222 are inclined toward each other, the handle 30 is held firmly on the projecting prong section 10. Furthermore, because the gripping portion 225 is inclined toward the side of the small retaining piece 212 and has a pointed tip which is in frictional engagement with a portion of the handle 30 between the small retaining piece 212 and the large retaining piece 222, the removal of the handle 30 from the projection prong section 10 is prevented.

When it is desired to transport or store the modular bamboo rake, the handle 30 is forced to remove from the projecting prong section 10. Then, the small retaining piece 212 and the large retaining piece 222 lie on the small fastening plate 21 and the large fastening plate 22, respectively.

With this invention thus explained, it is apparent that numerous modifications and variations can be made without departing from the scope and spirit of this invention. It is therefore intended that this invention be limited only as indicated in the appended claims.

I claim:

1. A modular bamboo rake including a long handle with a truncately conical lower end portion, and a projecting prong section generally shaped in the form of a sector, said projecting prong section having an upper end portion attached to said lower end portion of said handle and including a plurality of prongs and two clamping sheets holding said prongs therebetween, characterized by:

a small fastening plate secured to an upper surface of one of said clamping sheets which is attached to an upper surface of said projecting prong section;

a large fastening plate secured to said upper end portion of said projecting prong section;

a U-shaped small retaining piece mounted pivotally on an upper surface of said small fastening plate at two ends thereof and having two generally longitudinal arms and a connecting portion interconnecting said longitudinal arms of said small retaining piece;

a U-shaped large retaining piece mounted pivotally on an upper surface of said large fastening plate at two ends thereof and having two generally longitudinal arms and a connecting portion interconnecting said longitudinal arms of said large retaining piece;

an elongated connecting plate connected rotatably to said connecting portion of one of said small and large retaining pieces at an end portion thereof and having a lengthwise extending slide slot formed through the other end portion of said connecting plate, said connecting portion of the other of said small and large retaining pieces being confined in said slide slot, said connecting portions of said small and large retaining pieces being respectively spaced apart from said small and large fastening plates at predetermined distances, so as to clamp said truncately conical lower end portion of said long handle between said small retaining piece and said small fastening plate and between said large retaining piece and said large fastening plate;

whereby said handle can be forced to remove from said projecting prong section, thereby permitting said small and large retaining pieces to lie on said small and large fastening plates.

2. A bamboo rake as claimed in claim 1, wherein said large fastening plate is made of a metal and has two aligned rectangular holes formed therethrough, said rake including a U-shaped fastening sheet having two parallel arms extending through said rectangular holes, and a connecting portion interconnecting said arms of said fastening sheet, two ends of said fastening sheet extending outward in a direction generally parallel to said large fastening plate so as to prevent removal of said fastening sheet from said large fastening plate, said upper end portion of said projecting prong section being clamped between said connecting portion of said fastening sheet and said large fastening plate, so as to fix said large fastening plate on said upper end portion of said projecting prong section.

3. A bamboo rake as claimed in claim 1, wherein said large fastening plate includes a gripping portion projecting from an upper surface thereof, said gripping portion being inclined toward said small retaining piece and having a pointed tip which is in frictional contact with a portion of said handle between said small and large retaining pieces, so as to prevent removal of said handle from said projecting prong section.

* * * * *